United States Patent
Fujita

(10) Patent No.: US 9,432,635 B2
(45) Date of Patent: Aug. 30, 2016

(54) INSPECTION DEVICE FOR ARTICLE BEING INSPECTED, SPARK PLUG INSPECTION METHOD, AND METHOD FOR MANUFACTURING SPARK PLUG

(75) Inventor: Asako Fujita, Nagoya (JP)

(73) Assignee: NGK SPARK PLUG CO., LTD., Nagoya (JP)

(*) Notice: Subject to any disclaimer, the term of this patent is extended or adjusted under 35 U.S.C. 154(b) by 553 days.

(21) Appl. No.: 13/878,870

(22) PCT Filed: Dec. 15, 2011

(86) PCT No.: PCT/JP2011/078998
§ 371 (c)(1),
(2), (4) Date: Apr. 11, 2013

(87) PCT Pub. No.: WO2012/081654
PCT Pub. Date: Jun. 21, 2012

(65) Prior Publication Data
US 2014/0204198 A1    Jul. 24, 2014

(30) Foreign Application Priority Data

Dec. 15, 2010 (JP) ................. 2010-278970

(51) Int. Cl.
*H04N 7/18* (2006.01)
*H01T 13/58* (2011.01)
*H01T 21/02* (2006.01)

(52) U.S. Cl.
CPC .............. *H04N 7/183* (2013.01); *H01T 13/58* (2013.01); *H01T 21/02* (2013.01); *Y10T 29/49769* (2015.01)

(58) Field of Classification Search
CPC ........... G01N 21/9501; G01N 21/956; H04N 1/00588
See application file for complete search history.

(56) References Cited

U.S. PATENT DOCUMENTS 6,059,121 A * 5/2000 Hirose .......................... 209/559
2002/0142696 A1* 10/2002 Ito et al. .......................... 445/3

(Continued)

FOREIGN PATENT DOCUMENTS

| JP | 11-108637 A | 4/1999 |
|---|---|---|
| JP | 2000-131244 A | 5/2000 |

(Continued)

OTHER PUBLICATIONS

International Search Report mailed Mar. 13, 2012 for the corresponding PCT Application No. PCT/JP2011/078998.

*Primary Examiner* — Joseph Ustaris
*Assistant Examiner* — Zhubing Ren
(74) *Attorney, Agent, or Firm* — Leason Ellis LLP

(57) ABSTRACT

A spark plug is held by a work holder, and an illumination device is disposed between a rear end surface of a metal terminal of the spark plug and a lens of a CCD camera. The positional relationship among the rear end surface, the lens and a light source is determined such that regular reflected light resulting from regular reflection of irradiation light emitted from the light source and impinging on the rear end surface is not incident on the lens. In capturing an image of the rear end surface not only is the regular reflected light not incident on the lens, but also the incidence, on the lens of irregular reflected light resulting from irregularities on the rear end surface is reduced, whereby interference of reflected light with a captured image can be reduced.

18 Claims, 6 Drawing Sheets

(56) References Cited

U.S. PATENT DOCUMENTS

2005/0122508 A1* 6/2005 Uto .................... G01N 21/956
                                                         356/237.2
2006/0244955 A1    11/2006 Schramm et al.

FOREIGN PATENT DOCUMENTS

| JP | 2003-196641 A | 7/2003 |
| JP | 2004-092410 A | 3/2004 |
| JP | 2008-539589 A | 11/2008 |

* cited by examiner

INSPECTION DEVICE FOR ARTICLE BEING INSPECTED, SPARK PLUG INSPECTION METHOD, AND METHOD FOR MANUFACTURING SPARK PLUG

CROSS-REFERENCE TO RELATED PATENT APPLICATIONS

This application is a U.S. National Phase Application under 35 U.S.C. §371 of International Patent Application No. PCT/JP2011/078998, filed Dec. 15, 2011, and claims the benefit of Japanese Patent Application No. 2010-278970, filed Dec. 15, 2010, all of which are incorporated by reference herein. The International Application was published in Japanese on Jun. 21, 2012 as International Publication No. WO/2012/081654 under PCT Article 21(2).

FIELD OF THE INVENTION

The present invention relates to an inspection device for an inspection object (an article being inspected) for inspecting an identification mark formed on the inspection object, to a spark plug inspection method, and to a method for manufacturing a spark plug.

BACKGROUND OF THE INVENTION

Various types of spark plugs for igniting an air-fuel mixture are prepared according to types of internal combustion engines to which the spark plugs are to be mounted. Thus, in, for example, an automobile assembly process, in order to allow a worker to readily select a spark plug of a type corresponding to an engine to which the spark plug is to be mounted, the spark plug bears an identification mark (mark) corresponding to a spark plug type. In order to facilitate checking of the identification mark in the course of or after mounting the spark plug, the identification mark is marked on the rear end surface of a metal terminal. Also, some spark plugs bear a mark indicative of orientation of mounting to an engine (refer to, for example, Japanese Patent Application Laid-Open (kokai) No. 2004-92410).

Incidentally, since the identification mark is formed, by, for example, printing, on the rear end surface of the metal terminal formed from metal, the identification mark may have a chip, patchy appearance, or a like defect. However, even though the identification mark has a chip or patchy appearance to some extent, since the identification mark is sufficiently identifiable depending on the degree of chipping or patchy appearance, such a defect does not hinder automobile assembly work. Thus, conventionally, after the identification mark is printed, an inspector visually inspects to see whether or not the identification mark is identifiable. However, visual inspection by an inspector consumes time and labor. Also, since the degree of chipping or patchy appearance of the identification mark to be judged identifiable varies from person to person, a worker may fail to identify the identification mark which has been judged identifiable by the inspector. Thus, the inventors of the present invention et al. captured an image of an inspection object surface and tried inspecting the identification mark by use of a publicly known image processing technique.

However, since the rear end surface of the metal terminal is a metal surface and has residual fine irregularities, a captured image is apt to be susceptible to reflected light resulting from irregular reflection of illumination light which illuminates the rear end surface of the metal terminal in capturing an image; thus, image processing has encountered difficulty in identifying the identification mark.

SUMMARY OF THE INVENTION

An object of the present invention is to provide an inspection device for an inspection object which can accurately inspect an identification mark formed on the inspection object, a spark plug inspection method, and a method for manufacturing a spark plug.

A first mode of the present invention provides an inspection device for an inspection object for inspecting an identification mark formed on an inspection object surface of metal of the inspection object, comprising image capture means for capturing an image of the inspection object surface from an image capture direction orthogonal to the inspection object surface; holding means for holding the inspection object such that a predetermined distance along the image capture direction is established between the image capture means and the inspection object surface; illumination means having a light source, adapted to illuminate the inspection object surface with irradiation light emitted from the light source, and disposed at a position which is located between the inspection object surface and the image capture means with respect to the image capture direction such that reflected light resulting from regular reflection of the irradiation light impinging on the inspection object surface is not incident on the image capture means; image processing means for performing image processing on a captured image captured by the image capture means, and acquiring characteristic information about characteristics of the identification mark from an image of the identification mark in the captured image; and judging means for comparing the characteristic information of the identification mark and characteristic information about characteristics of a reference mark acquired beforehand from an image of the reference mark, and judging whether or not the identification mark and the reference mark are the same mark.

Since the inspection object surface of the inspection object is of metal, reflected light resulting from regular reflection of irradiation light emitted from the light source and impinging on the inspection object surface is unlikely to attenuate in amount of light, and has high luminance. Thus, according to the first mode, the illumination means is disposed at a position such that reflected light resulting from regular reflection of irradiation light impinging on the inspection object surface is not incident on the image capture means. Accordingly, not only is the reflected light resulting from regular reflection reliably not incident on the image capture means, but also there can be reduced the incidence, on the image capture means, of reflected light resulting from irregular reflection from the inspection object surface. Therefore, the image capture means is less affected by high-luminance reflected light reflecting from the inspection object surface, so that the image capture means can more reliably capture relatively-low-luminance scattered light scattered from the surface of the identification mark.

In the first mode, the light source of the illumination means may be disposed at such a position as to shed the irradiation light on the inspection object surface in a direction which forms an angle of 45 degrees or less with respect to the inspection object surface. When the illumination light is shed on the inspection object surface in a direction which forms an angle of 45 degrees or less with respect to the inspection object surface, regular reflected light also leaves the inspection object surface in a direction which forms an angle of 45 degrees or less with respect to the inspection object surface; therefore, the regular reflected light can be reliably not incident on the image capture means.

In the first mode, the illumination means may be configured such that a single piece of the light source is disposed continuously around a line coinciding with the image capture direction or such that a plurality of the light sources are disposed intermittently around the line coinciding with the image capture direction. Since the light source is disposed in such a manner as to surround the outer circumference of the inspection object surface, unevenness in illumination on the inspection object surface is reduced, whereby a clear image can be captured.

In the above case, the inspection object surface of the inspection object may have a maximum diameter or diagonal length of 10 mm or less, and the illumination means may be configured such that the light source is disposed annularly and has a minimum inside diameter of 10 mm. Since the light source is not disposed in a direction perpendicular to the inspection object surface, the degree of freedom can be increased for the positional relationship among the light source, the inspection object surface, and the image capture means for avoiding the incidence, on the image capture means, of reflected light resulting from regular reflection. Furthermore, in this case, the distance along the image capture direction between the inspection object surface and the light source of the illumination means may be 10 mm or less. Through employment of such a distance, not only can the reflected light resulting from regular reflection be reliably not incident on the image capture means, but also there can be restrained the incidence, on the image capture means, of reflected light resulting from irregular reflection. Therefore, relatively-low-luminance scattered light scattered from the surface of the identification mark can be more reliably captured, whereby a clear image can be captured.

In the first mode, the inspection object may be a metal terminal of a spark plug, and the identification mark may be formed by printing on the rear end surface of the metal terminal. Through employment of printing for formation of the identification mark, ink can be evenly applied onto the inspection object surface; thus, the generation of irregularities on the surface of the identification mark can be readily restrained, and scattered light scattered from the surface of the identification mark can be reduced in the degree of scattering, so that an even, clear image can be captured.

A second mode of the present invention provides an inspection method for a spark plug for inspecting an identification mark formed on a rear end surface of a metal terminal of a spark plug, comprising a holding step of holding the spark plug such that a predetermined distance is established along an image capture direction orthogonal to the rear end surface of the metal terminal between the rear end surface and image capture means for capturing an image of the rear end surface; an illuminating step of illuminating the rear end surface with irradiation light by illumination means having a light source which is disposed between the rear end surface and the image capture means with respect to the image capture direction at a position such that reflected light resulting from regular reflection of the irradiation light emitted from the light source and impinging on the rear end surface is not incident on the image capture means; an image capturing step of capturing an image of the rear end surface from the image capture direction by the image capture means; an image processing step of performing image processing on a captured image captured by the image capture means, and acquiring characteristic information about characteristics of the identification mark from an image of the identification mark in the captured image; and a judging step of comparing the characteristic information of the identification mark and characteristic information about characteristics of a reference mark acquired beforehand from an image of the reference mark, and judging whether or not the identification mark and the reference mark are the same mark.

Since the metal terminal of the spark plug is of metal, reflected light resulting from regular reflection of irradiation light emitted from the light source and impinging on the rear end surface is unlikely to attenuate in amount of light, and has high luminance. Thus, according to the second mode, the illumination means is disposed at a position such that reflected light resulting from regular reflection of irradiation light impinging on the rear end surface is not incident on the image capture means. Accordingly, not only is the reflected light resulting from regular reflection reliably not incident on the image capture means, but also there can be reduced the incidence, on the image capture means, of reflected light resulting from irregular reflection from the rear end surface. Therefore, the image capture means is less affected by high-luminance reflected light reflecting from the rear end surface, so that the image capture means can more reliably capture relatively-low-luminance scattered light scattered from the surface of the identification mark.

In the second mode, in the illuminating step, the irradiation light may be shed on the rear end surface in a direction which forms an angle of 45 degrees or less with respect to the rear end surface. When the illumination light is shed on the rear end surface in a direction which forms an angle of 45 degrees or less with respect to the rear end surface, regular reflected light also leaves the rear end surface in a direction which forms an angle of 45 degrees or less with respect to the rear end surface; therefore, the regular reflected light can be reliably not incident on the image capture means.

In the second mode, the illumination means may be configured such that a single piece of the light source is disposed continuously around a line coinciding with the image capture direction or such that a plurality of the light sources are disposed intermittently around the line coinciding with the image capture direction. Since the light source is disposed in such a manner as to surround the outer circumference of the rear end surface, unevenness in illumination on the rear end surface is reduced, whereby a clear image can be captured.

In the above case, the rear end surface of the metal terminal may have a maximum diameter or diagonal length of 10 mm or less, and the illumination means may be configured such that the light source is disposed annularly and has a minimum inside diameter of 10 mm. Since the light source is not disposed in a direction perpendicular to the rear end surface, the degree of freedom can be increased for the positional relationship among the light source, the rear end surface, and the image capture means for avoiding the incidence, on the image capture means, of reflected light resulting from regular reflection. Furthermore, in this case, the distance along the image capture direction between the rear end surface and the light source of the illumination means may be 10 mm or less. Through employment of such a distance, not only can the reflected light resulting from regular reflection be reliably not incident on the image capture means, but also there can be restrained the incidence, on the image capture means, of reflected light resulting from irregular reflection. Therefore, relatively-low-luminance scattered light scattered from the surface of the identification mark can be more reliably captured, whereby a clear image can be captured.

A third mode of the present invention provides a method for manufacturing a spark plug, comprising a manufacturing step of manufacturing the spark plug by attaching, to a metallic shell, a ceramic insulator which holds a forward end portion of a metal terminal; a marking step of forming an identification mark on a rear end surface of the metal terminal; and an inspection step of inspecting the identification mark; the method being characterized in that the inspection step comprises a holding step of holding the spark plug such that a predetermined distance is established along an image capture direction orthogonal to the rear end surface of the metal terminal between the rear end surface and image capture means for capturing an image of the rear end surface; an illuminating step of illuminating the rear end surface with irradiation light by illumination means having a light source which is disposed between the rear end surface and the image capture means with respect to the image capture direction at a position such that reflected light resulting from regular reflection of the irradiation light emitted from the light source and impinging on the rear end surface is not incident on the image capture means; an image capturing step of capturing an image of the rear end surface from the image capture direction by the image capture means; an image processing step of performing image processing on a captured image captured by the image capture means, and acquiring characteristic information about characteristics of the identification mark from an image of the identification mark in the captured image; and a judging step of comparing the characteristic information of the identification mark and characteristic information about characteristics of a reference mark acquired beforehand from an image of the reference mark, and judging whether or not the identification mark and the reference mark are the same mark.

Since the metal terminal of the spark plug is of metal, reflected light resulting from regular reflection of irradiation light emitted from the light source and impinging on the rear end surface is unlikely to attenuate in amount of light, and has high luminance. Thus, in the inspection step of the method for manufacturing a spark plug according to the third mode, the illumination means is disposed at a position such that reflected light resulting from regular reflection of irradiation light impinging on the rear end surface is not incident on the image capture means. Accordingly, not only is the reflected light resulting from regular reflection reliably not incident on the image capture means, but also there can be reduced the incidence, on the image capture means, of reflected light resulting from irregular reflection from the rear end surface. Therefore, the image capture means is less affected by high-luminance reflected light reflecting from the rear end surface, so that the image capture means can more reliably capture relatively-low-luminance scattered light scattered from the surface of the identification mark.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Modes for Carrying Out the Invention

An embodiment of the present invention will be described with reference to the drawings, taking an inspection device 100 for inspecting a spark plug 1 as an example of an inspection device for an inspection object. The drawings referred to are used merely to explain technical features which the present invention can employ. Device configuration, a flowchart of processes, etc., appearing on the drawings are mere examples for explanation and should not be construed as limiting the invention.

Figure 1:
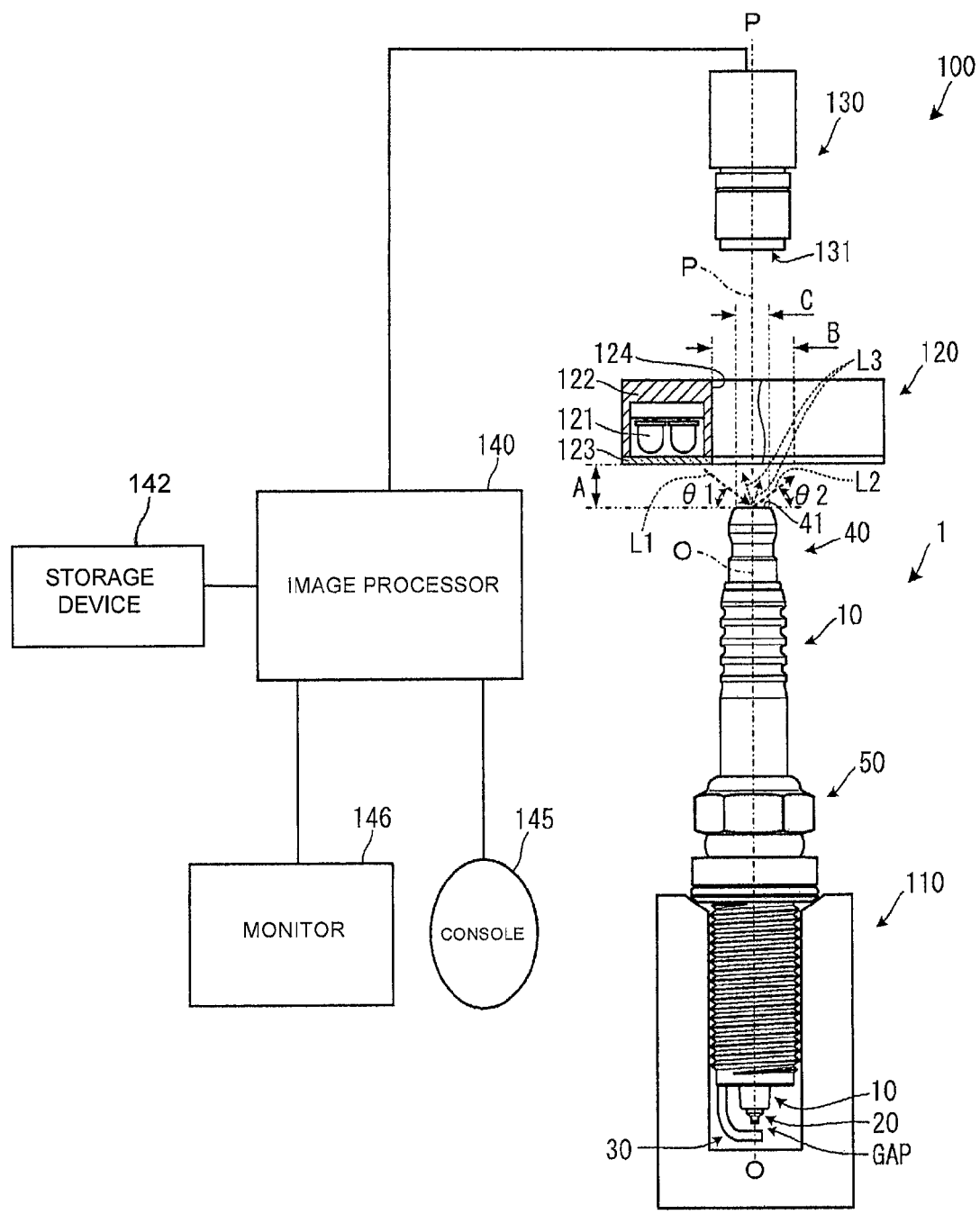
FIG. 1 shows a schematic configuration of an inspection device 100 in a state in which a spark plug 1 to be inspected is held by a work holder 110.
Figure 2:
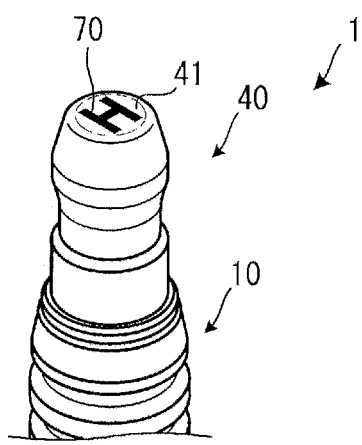
FIG. 2 shows an identification mark 70 marked on a rear end surface 41 of a metal terminal 40 of the spark plug 1.

The inspection device 100 for the spark plug 1 shown in FIG. 1 is adapted to inspect an identification mark 70 (see FIG. 2) formed on a rear end surface 41 of a metal terminal 40 of the spark plug 1. The spark plug 1 to be inspected has, as publicly known, the following structure: a tubular metallic shell 50 surrounds and holds a ceramic insulator 10 which holds a center electrode 20 in its axial bore on the forward side of the axial bore and holds a metal terminal 40 formed from metal on the rear side of the axial bore. The center electrode 20 and the metal terminal 40 are electrically connected to each other within the axial bore of the ceramic insulator 10. A ground electrode 30 is joined to a forward end portion of the metal terminal 50, and the ground electrode 30 is bent toward the center electrode 20, thereby forming a spark discharge gap GAP between the ground electrode 30 and the center electrode 20. When high voltage is applied between the metal terminal 40 and the metallic shell 50, spark discharge is generated across the spark discharge gap GAP, thereby igniting an air-fuel mixture. As shown in FIG. 2, the identification mark 70 is formed on the rear end surface 41 of the metal terminal 40 of metal through application of ink, such as printing or sealing. In the present embodiment, the letter "H" is used as the identification mark; however, the identification mark is not limited to a letter, but a symbol or figure may be used as the identification mark.

As shown in FIG. 1, the inspection device 100 is composed of a work holder 110, an illumination device 120, a CCD camera 130, an image processor 140, a console 145, a monitor 146, etc. The work holder 110 is a jig which holds the spark plug 1 such that the rear end surface 41 of the metal terminal 40 of the spark plug 1 to be inspected is oriented toward the CCD camera 130 with the direction of an axis O of the spark plug 1 aligned with the direction of an optical axis P of the CCD camera 130. The CCD camera 130 is adapted to capture an image of the rear end surface 41 of the metal terminal 40. The CCD camera 130 is positioned and fixed beforehand in alignment with the position of the work holder 110 such that, as mentioned above, the direction of the optical axis P is aligned with the direction of the axis O of the spark plug 1 held by the work holder 110. The CCD camera 130 is focused beforehand on the rear end surface 41 of the metal terminal 40 of the spark plug 1 held by the work holder 110. The CCD camera 130 is connected to the image processor 140 for analyzing an image captured by the CCD camera 130 according to image processing, which will be described later.

Figure 3:
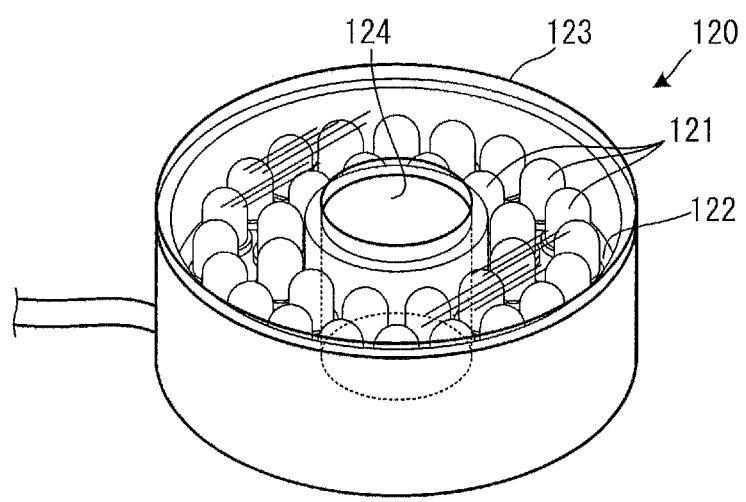
FIG. 3 is a perspective view of an illumination device 120.

The illumination device 120 is disposed between the CCD camera 130 and the rear end surface 41 of the metal terminal 40 of the spark plug 1 held by the work holder 110. In the present embodiment, as shown in FIG. 3, the illumination device 120 is ring illumination having a structure in which a plurality of white-light LEDs 121 are arrayed in an annular base section 122. The illumination device 120 has an annular diffusion plate 123 provided on the forward side (upper side in FIG. 3) with respect to the light emitting direction of the plurality of LEDs 121 for emitting LED light outward in a diffused condition so as to reduce unevenness in luminance. Also, the illumination device 120 has a hole 124 formed at its center. As shown in FIG. 1, the CCD camera 130 captures an image of the identification mark 70 through the hole 124 of the illumination device 120.

The image processor 140 carries a CPU, a ROM, a RAM, and an external storage device 142 (HDD, flash memory, etc.), which are publicly known, and analyzes input images. In the present embodiment, the image processor 140 analyzes an image captured by the CCD camera 130; inspects the identification mark 70 according to a program (see FIG. 4), which will be described later; and output inspection results. In addition to the above-mentioned CCD camera 130, the console 145 is connected to the image processor 140 and is used as an input device for an inspector to input operation instructions for the image processor 140. Also, the monitor 146 is connected to the image processor 140 and is used as an output device for displaying an image captured by the CCD camera 130 and inspection results and allowing an inspector to check to see operation instructions, set preferences, etc.

Incidentally, as mentioned above, the metal terminal 40 of the spark plug 1 to be inspected is formed from metal; thus, the rear end surface 41 to be inspected is also of metal. Therefore, since light is substantially totally reflected from the rear end surface 41, reflected light resulting from reflection of irradiation light is unlikely to attenuate in amount of light and has high luminance. Meanwhile, on the surface of the identification mark 70, some wavelengths of light are scattered, and other wavelengths are absorbed. Thus, scattered light resulting from scattering of irradiation light from the surface of the identification mark 70 is relatively low in luminance and is thus apt to be susceptible to interference of relatively-high-luminance reflected light resulting from reflection of irradiation light from the rear end surface 41. Thus, in the present embodiment, in order to reduce interference with scattered light scattered from the surface of the identification mark 70, the following provisions are made.

First, as shown in FIG. 1, there is made the provision that reflected light (hereinafter, may be referred to as "regular reflected light") L2 resulting from regular reflection of irradiation light L1 emitted from the illumination device 120 and impinging on the rear end surface 41 is not incident directly on the CCD camera 130. Specifically, assuming that, for simplification, the rear end surface 41 to be inspected is a smooth surface, a desirable disposition of the CCD camera 130 is such that, even when the irradiation light L1 emitted from the light source of the illumination device 120 is incident on the rear end surface 41 at any position, a lens 131 of the CCD camera 130 is not located in the path of the regular reflected light L2 resulting from regular reflection of the irradiation light L1. In other words, while the light source of the illumination device 120 is disposed between the lens 131 of the CCD camera 130 and the rear end surface 41 of the metal terminal 40, it suffices for the positional relationship among the three members (lens 131, rear end surface 41, light source) to satisfy the above-mentioned condition. Strictly speaking, as mentioned above, the light source of the illumination device 120 is the LEDs 121; however, light emitted from the LEDs 121 is diffused by the diffusion plate 123 and is emitted outward as irradiation light with the diffusion plate 123 as starting point. Therefore, in the present embodiment, the LEDs 121 and the diffusion plate 123 are collectively considered as the light source of the illumination device 120.

Irregularities may remain on the rear end surface 41 of metal. When the rear end surface 41 is irradiated with the irradiation light L1 emitted from the illumination device 120, there is generated not only the regular reflected light L2 but also reflected light (hereinafter, may be referred to as "irregular reflected light") L3 resulting from irregular reflection caused by irregularities on the rear end surface 41. In this connection, as mentioned above, by means of the light source, the rear end surface 41, and the lens 131 establishing the positional relationship such that the regular reflected light L2 is not incident directly on the CCD camera 130, there can be reduced an angle θ1 of incidence at which the irradiation light L1 from the light source is incident on the rear end surface 41. Accordingly, not only does an angle θ2 of emergence of the regular reflected light L2 resulting from regular reflection from the rear end surface 41 reduce, but also the angle of emergence of the irregular reflected light L3 resulting from irregular reflection from the rear end surface 41 is likely to reduce. Therefore, the irregular reflected light L3 incident on the CCD camera 130 reduces, whereby there can be reduced interference with scattered light scattered from the surface of the identification mark 70.

Furthermore, the present embodiment makes the provision that the illumination device 120 is disposed such that the irradiation light L1 of the illumination device 120 is incident on the rear end surface 41 in a direction which forms an angle of 45 degrees or less with respect to the center of the rear end surface 41. By means of the angle θ1 of incidence of the irradiation light L1 impinging on the rear end surface 41 being 45 degrees or less, the angle θ2 of emergence of the regular reflected light L2 reflected from the rear end surface 41 also becomes 45 degrees or less. Thus, it can be reliably prevented that the regular reflected light L2 is incident directly on the CCD camera 130 disposed at a position substantially perpendicular to the rear end surface 41. Also, the irregular reflected light L3 incident on the CCD camera 130 can also be reliably reduced, whereby interference with scattered light scattered from the surface of the identification mark 70 can be further reduced.

Also, in the present embodiment, the spark plug 1 is an inspection object, and a maximum diameter C of the rear end surface 41, which is an inspection object surface, of the metal terminal 40 generally assumes a value of 10 mm or less. Therefore, the illumination device 120 disposed between the CCD camera 130 and the rear end surface 41 is such that an inside diameter B of the hole 124 assumes a minimum value of 10 mm. That is, the inside diameter B of the hole 124 is equal to or greater than the diameter C of the rear end surface 41. In this manner, when a distance A (which will be described later) between the illumination device 120 and the rear end surface 41 of the metal terminal 40 is fixed, the greater the inside diameter B of the hole 124, the smaller the angle θ1 of incidence of the irradiation light L1 impinging on the rear end surface 41 can be. Thus, there can be prevented direct incidence of the regular reflected light L2 on the CCD camera 130, and, similarly, incidence of the irregular reflected light L3 can be reliably reduced; therefore, interference with scattered light scattered from the surface of the identification mark 70 can be further reduced.

Furthermore, the present embodiment makes the provision that the distance A between the rear end surface 41 of the metal terminal 40 and the light source of the illumination device 120 with respect to the image capture direction of the CCD cameral 130 (i.e., the direction of the optical axis P) is 10 mm or less. The closer to the rear end surface 41 the position of the light source (herein, the position of the diffusion plate 123) of the illumination device 120, the smaller the angle θ1 of incidence of the irradiation light L1 impinging on the rear end surface 41 can be. Accordingly, there can be prevented direct incidence of the regular reflected light L2 on the CCD camera 130, and, similarly, incidence of the irregular reflected light L3 can be reliably reduced; therefore, interference with scattered light scattered from the surface of the identification mark 70 can be further reduced.

In this manner, in the inspection device 100, an image of the inspection object surface is captured in such a manner that the regular reflected light L2 resulting from regular reflection of the irradiation light L1 emitted from the light source of the illumination device 120 and impinging on the rear end surface 41 of the metal terminal 40 is not incident on the CCD camera 130 and that incidence of the irregular reflected light L3 resulting from irregular reflection from the rear end surface 41 is reduced. Therefore, since interference of reflected light from the rear end surface 41 with scattered light scattered from the surface of the identification mark 70 can be reduced, the image processor 140 can more accurately perform analysis of an image captured by the CCD camera 130, which will be described below.

Next, inspection of the identification mark 70 by the inspection device 100 will be described. The identification mark 70 is inspected by executing a program installed in an external storage device 142 of the image processor 140 and shown in the flowchart of FIG. 4. Various kinds of letters, symbols, figures, etc. are prepared as identification marks of inspection objects, and template patterns are prepared for the identification marks and installed or registered together with the program. In the present embodiment, an inspection object is the spark plug 1 in which the letter "H" is marked, as the identification mark 70, on the rear end surface 41 of the metal terminal 40, and, in execution of the program, an inspector selects a pattern 80 of "H" shown in FIG. 5 from among the plurality of patterns prepared beforehand. A center position 81 (in FIG. 5, represented by the cross mark) is determined for the patterns including the pattern 80 of "H". The size of a pattern depends on resolution of the CCD camera 130, an image capture distance, etc., and is determined appropriately on the basis of a captured image of a sample of the spark plug 1 bearing a normal identification mark 70, the image of the sample being captured prior to inspection. Furthermore, the sizes of pattern frames 82 and 83 (see FIG. 11) for use in calculating an entire area and an inside area, respectively, which will be described later, the entire area, and a threshold of the inside area are adjusted appropriately according to the size of the pattern appearing in the captured image of the sample.

Figure 4:
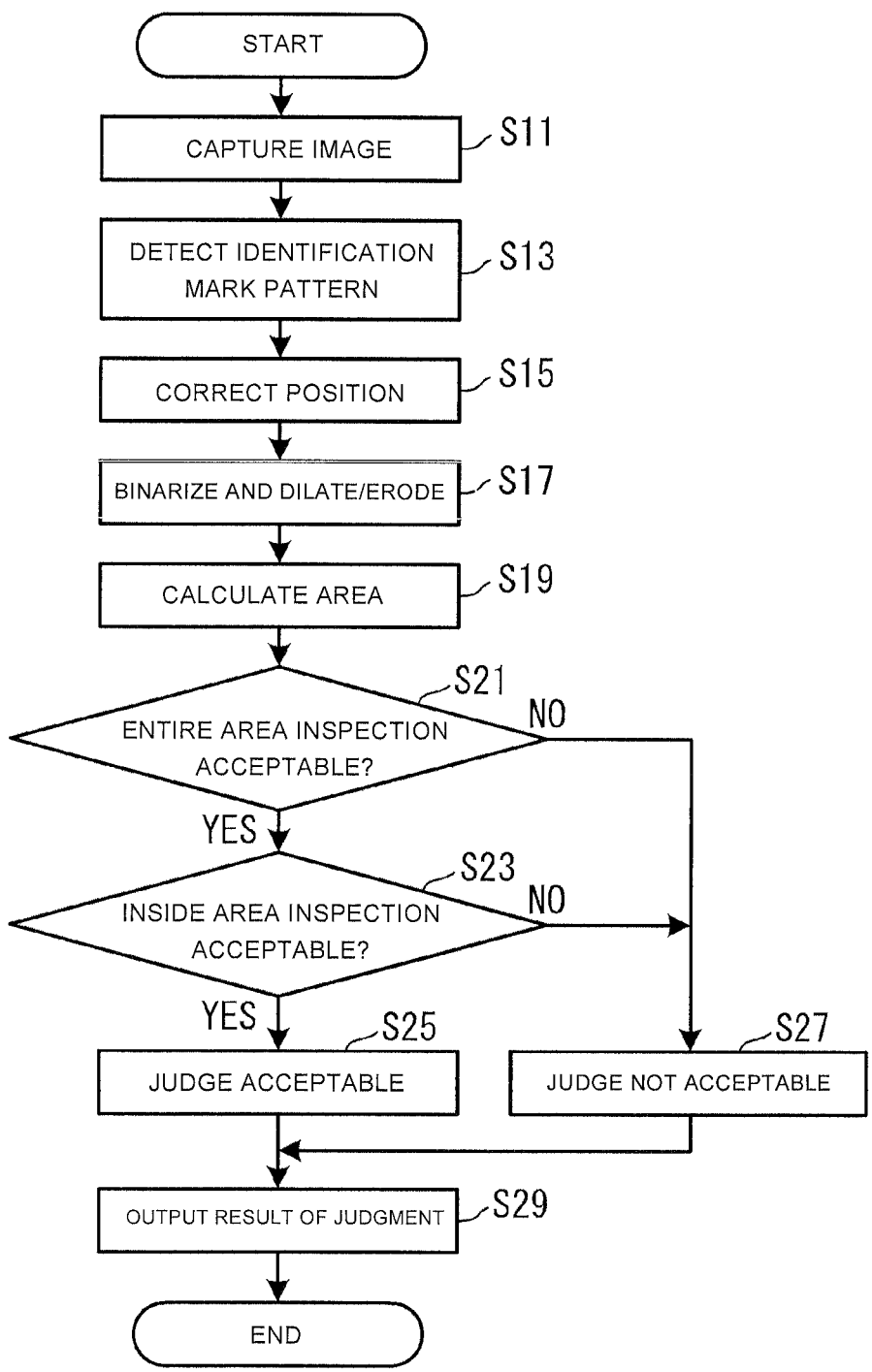
FIG. 4 is a flowchart showing a program for inspecting the identification mark 70.
Figure 5:
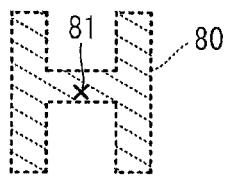
FIG. 5 shows an example of a marking pattern.
Figure 6:
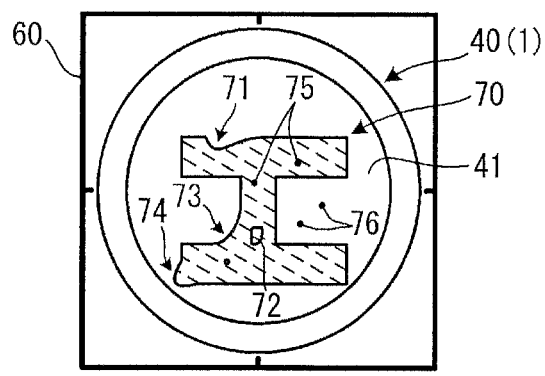
FIG. 6 shows a captured image.

When an inspector disposes the spark plug 1 to be inspected, in the work holder 110 of the inspection device 100 (holding step) and instructs, on the console 145 of the image processor 140, the inspection device 100 to execute the program, inspection of the identification mark 70 is performed according to the flowchart shown in FIG. 4. Each step in the flowchart is abbreviated to "S." First, the illumination device 120 is turned on (illuminating step); the CCD camera 130 captures an image of the rear end surface 41 of the metal terminal 40 (image capturing step); and, as shown in FIG. 6, data on a captured image 60 is read into RAM of the image processor 140 (S11). For convenience of explanation, an identification mark 70 having marking defects is shown by way of example. Specifically, the identification mark 70 in the form of the letter "H" has printing defects, such as a chip 71, a hole 72, a blur 73, and a protrusion 74. Furthermore, the identification mark 70 in the captured image 60 is accompanied by noise, such as pinholes 75 inside the identification mark 70 and fine dots 76 outside the identification mark 70, caused by the irregular reflected light L3.

Figure 7:
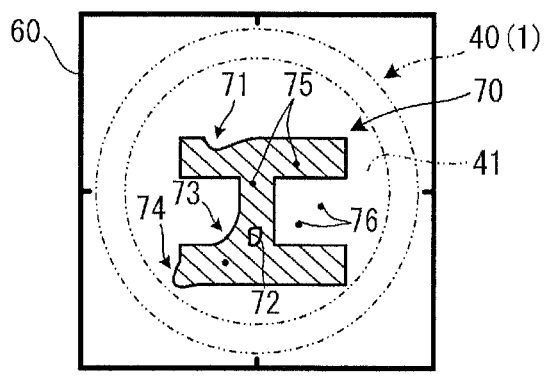
FIG. 7 shows a state in which a color shade processing is performed on the captured image.
Figure 8:
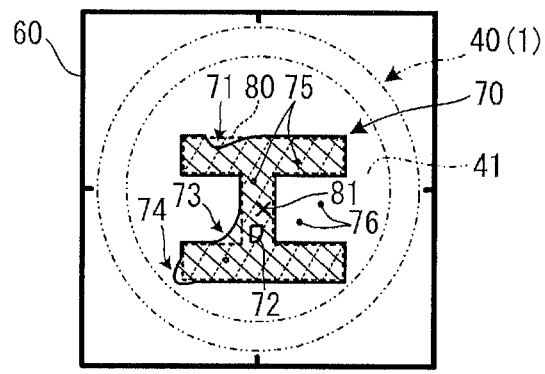
FIG. 8 shows a state in which pattern matching is performed on the captured image.
Figure 9:
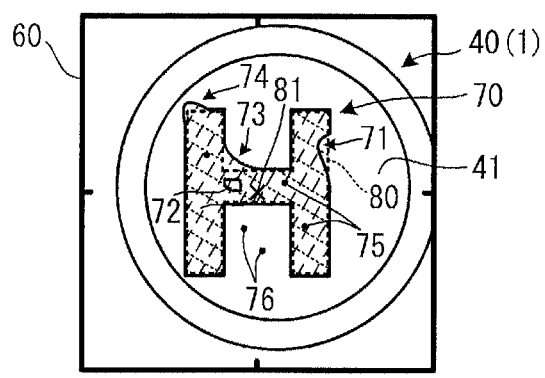
FIG. 9 shows a state in which the position of a detected identification mark is corrected.

Next, a publicly known color extraction process (first color extraction process) is performed on the captured image 60 for color extraction by means of the ink color of the identification mark 70 and its approximate colors. As shown in FIG. 7, distinction between the rear end surface 41 and the identification mark 70 is facilitated within the captured image 60. Then, a publicly known pattern detection process is performed, using the pattern 80 of "H" shown in FIG. 5 as a template (S13). Specifically, a so-called template matching process is performed. As shown in FIG. 8, while the position (position of the center position 81) and orientation (angle of rotation) of the template (pattern 80) are varied, the captured image 60 and the template are superimposed on each other for obtaining a correlation value between the template and the captured image 60, thereby performing search for a region having a highest correlation value. After the search, the region having the highest correlation value is recognized as a region where the identification mark 70 is formed. This process provides the position and orientation (angle of rotation) of the identification mark 70 in the captured image 60. In the subsequent position correction process, on the basis of the obtained position and orientation of the identification mark 70, the position of the identification mark 70 in the captured image 60 is corrected (S15). Specifically, as shown in FIG. 9, the image position in the captured image 60 is corrected such that the center position 81 of the pattern 80 comes to the center of the captured image 60 and such that the orientation of the pattern 80 becomes the default orientation (angle of rotation 0°).

Figure 10:
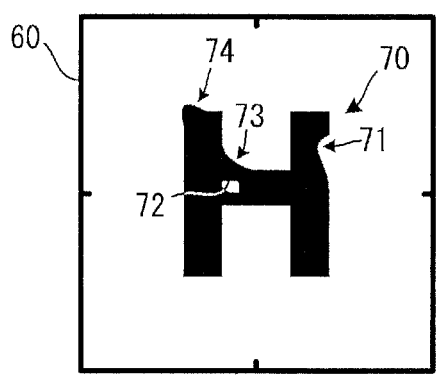
FIG. 10 shows a state in which a binarization process and a dilation/erosion process are performed on the captured image.

In the subsequent binarization and dilation/erosion processes (S17), a publicly known color extraction process (second color extraction process) is performed on the captured image 60 for color extraction by means of the ink color of the identification mark 70 and its approximate colors, under conditions different from those of the first color extraction process (of course, the results of the first color extraction process may be used intact). In the second color extraction process, the captured image 60 is binarized by use of a threshold more tolerant than that used in the first color extraction process so as to avoid the influence of uneven shading generated as a result of image capture. FIG. 10 shows a state in which the captured image 60 is binarized such that pixels indicative of the identification mark 70 are represented by black dots, whereas pixels indicative of background are represented by white dots. Furthermore, in S17, a publicly known dilation/erosion process is performed on the binarized captured image 60. In binarization, noise which emerges in the form of the pinholes 75 and the fine dots 76 in the captured image 60 as shown in FIG. 6 may remain, in the binarized image, in the form of pixels isolated from a group of surrounding pixels of the same color. By performing the dilation/erosion process, as shown in FIG. 10, the pixels isolated from the group of surrounding pixels can be removed.

Figure 11:
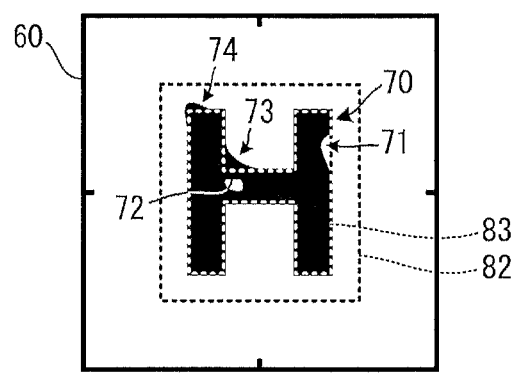
FIG. 11 indicates calculation of the entire area and inside area of the identification mark.

Next, the entire area and the inside area of the identification mark 70 are obtained (S19). As shown in FIG. 11, the pattern frames 82 and 83 corresponding to the predetermined pattern 80 of "H" are superimposed on the captured image 60 which has undergone the binarization process, etc., in S17. The pattern frame 82 is used for calculating the entire area and is prepared for each of the patterns, in the form of a frame greater than the outline of the identification mark 70 so as to accommodate therein the entire identification mark 70 as well as even the blur 73 and the protrusion 74 formed on the identification mark 70. In the present embodiment, the pattern frame 82 is prepared in the form of such a rectangular frame as to accommodate the identification mark 70 therein; however, the pattern frame 82 may be in the form of such a frame as to be located a certain distance away from the center of the captured image 60 and as to accommodate the entire identification mark 70 therein, or in the form of such a frame as to enclose the outline of the pattern 80 while being located a certain distance away from the outline of the pattern 80. The entire area is obtained by calculating the number of pixels (black dots) of the identification mark 70 within the pattern frame 82. The obtained entire area of the identification mark 70 is smaller, by the areas of the chip 71 and the hole 72, than the entire area of the normal identification mark 70 and is greater, by the areas of the blur 73 and the protrusion 74, than the entire area of the normal identification mark 70.

The pattern frame 83 is used for calculating the inside area and is the outline of the identification mark 70. Similar to the above, the inside area is obtained by calculating the number of pixels (black dots) of the identification mark 70 within the pattern frame 83. The obtained inside area of the identification mark 70 is smaller, by the areas of the chip 71 and the hole 72, than the inside area of the normal identification mark 70, and the blur 73 and the protrusion 74 have no influence on the obtained inside area (the above operation is of the image processing step).

The obtained entire area is compared with a predetermined threshold of the entire area (S21). An upper limit value and a lower limit value are predetermined as a threshold of the entire area. For example, when the obtained entire area fails to fall within the threshold range (S21: NO) as in the case where the obtained entire area is in excess of the upper limit value due to presence of a large protrusion 74 or the case where the obtained entire area is less than the lower limit value due to presence of a large hole 72, the identification mark 70 is judged not acceptable (S27) for the reason that the identification mark 70 has failed to pass the entire area inspection. When the obtained entire area falls within the threshold range (S21: YES), the inside area obtained in S19 is compared with a predetermined threshold of the inside area (S23). A lower limit value is predetermined as a threshold of the inside area; for example, when the obtained inside area is less than the lower limit value due to presence of a large chip 71 and/or hole 72 (S23: NO), the identification mark 70 is judged not acceptable (S27) for the reason that the identification mark 70 has failed to pass the inside area inspection. Therefore, for example, even in the case where the identification mark 70 has a large protrusion 74 as well as a large hole 72, and, thus, the obtained entire area falls within the range between the upper limit value and the lower limit value, abnormality in the identification mark 70 can be detected by the inside area inspection.

When the obtained inside area is equal to or greater than the lower limit value (S23: YES), the identification mark 70 is judged acceptable (S25) for the reason that the identification mark 70 has passed the entire area inspection and the inside area inspection (the above operation is of the judging step). After the judgment that the identification mark 70 is acceptable or not acceptable (S25 or S27), the result of judgment is displayed on the monitor 146 (S29), thereby completing inspection of the spark plug 1. By means of the identification mark 70 being judged acceptable or not acceptable on the basis of the entire area and the inside area, even when the shape of the identification mark 70 has defects, such as a chip and a protrusion, to some extent, if the defects are to such an extent as to allow recognition (identification) of the identification mark 70, the identification mark 70 is judged acceptable; therefore, yield can be boosted.

Needless to say, the present invention can be modified in various forms. For example, if the CCD camera 130 can focus, for image capture, on the identification mark 70 from a position in proximity to the identification mark 70, the illumination device 120 may be provided integral with the CCD camera 130. Also, the illumination device 120 employs LEDs as light source. However, the light source is not limited to LEDs, but may be an annular fluorescent tube or any other type of light source. Also, if the illumination device 120 can provide sufficient luminance, a polarizing filter may be used with the CCD camera 130.

The present embodiment can omit inspection of the rear end surface 41 of the metal terminal 40, since the following procedure is employed: in S13, the position and orientation of the identification mark 70 are recognized by performing the pattern detection process; in S15, positional correction is performed for disposition at the center of the captured image 60; and in S21 and S23, inspection is performed on the basis of the entire area and the inside area. Thus, the image processor 140 can reduce image processing load by load required to recognize the rear end surface 41. Of course, detection of the rear end surface 41 may be performed; in this case, there is no need to perform positional correction for redisposing the identification mark 70 at the center of the captured image 60, by employing the following procedure: the pattern frames 82 and 83 are matched with the position and orientation of the identification mark 70 in the image of the rear end surface 41, and, then, inspection is performed for judgment of acceptance or rejection.

Also, there may be provided a judging means which skips the processes in S15 to S23 and makes judgment of rejection in S27, judging that the degree of printing defect in the identification mark 70 is large in the case where, as a result of the pattern detection process in S13, a certain region in the captured image 60 is found to have a highest correlation value with respect to correlation with the pattern 80, but the highest correlation value is smaller than a predetermined value.

Also, there may be provided a judging means which skips the processes in S15 to S23 and makes judgment of rejection in S27, judging that the identification mark 70 greatly protrudes from the rear end surface 41 in the case where, as a result of the pattern detection process in S13, the distance between the center position 81 of the pattern 80 and the position of the center of the captured image 60 is greater than a predetermined value.

DESCRIPTION OF REFERENCE NUMERALS

1: spark plug
40: metal terminal
41: rear end surface
60: captured image
70: identification mark
100: inspection device
110: work holder
120: illumination device
121: LED
123: diffusion plate
130: camera
140: image processor

The invention claimed is:

1. A device for inspecting an identification mark formed on a surface of an inspection object, said surface being made of metal, comprising:
    a camera that captures an image of the inspection object surface in an image capturing direction orthogonal to the inspection object surface;
    a work holder that holds the inspection object such that a predetermined distance along the image capturing direction is established between the camera and the inspection object surface;
    an illuminator that has a light source, adapted to illuminate the inspection object surface with irradiation light emitted from the light source, and disposed at a position which is located between the inspection object surface and the camera with respect to the image capturing direction such that reflected light resulting from regular reflection of the irradiation light impinging on the inspection object surface is not incident on the camera;
    an image processor that processes an image captured by the camera, and acquires characteristic information of the identification mark from an image of the identification mark in the captured image;
    a storage device configured to execute a program that compares the characteristic information of the identification mark and characteristic information of a reference mark acquired beforehand from an image of the reference mark, and judges whether or not the identification mark and the reference mark are the same mark,
    the inspection object surface has a maximum diameter or diagonal length of 10 mm or less, and
    the illuminator is configured such that the light source has an annular shape, whose inside diameter is 10 mm or more.

2. The device for inspecting an inspection object according to claim 1, wherein the light source of the illuminator is disposed at such a position as to shed the irradiation light on the inspection object surface in a direction which forms an angle of 45 degrees or less with respect to the inspection object surface.

3. The device for inspecting an inspection object according to claim 2, wherein the illuminator is configured such that a single piece of the light source is disposed continuously around a line coinciding with the image capturing direction or such that a plurality of the light sources are disposed intermittently around the line coinciding with the image capturing direction.

4. The device for inspecting an inspection object according to claim 2, wherein the inspection object is a metal terminal of a spark plug, and the identification mark is formed by printing on a rear end surface of the metal terminal.

5. The device for inspecting an inspection object according to claim 1, wherein the illuminator is configured such that the light source is a single device disposed continuously around a line coinciding with the image capturing direction or a plurality of devices disposed intermittently around the line coinciding with the image capturing direction.

6. The device for inspecting an inspection object according to claim 5, wherein the inspection object is a metal terminal of a spark plug, and the identification mark is formed by printing on a rear end surface of the metal terminal.

7. The device for inspecting an inspection object according to claim 5, wherein the device is an LED.

8. The device for inspecting an inspection object according to claim 1, wherein a distance along the image capturing direction between the inspection object surface and the light source of the illuminator is 10 mm or less.

9. The device for inspecting an inspection object according to claim 8, wherein the inspection object is a metal terminal of a spark plug, and the identification mark is formed by printing on a rear end surface of the metal terminal.

10. The device for inspecting an inspection object according to claim 1, wherein the inspection object is a metal terminal of a spark plug, and the identification mark is formed by printing on a rear end surface of the metal terminal.

11. A method for inspecting an identification mark formed on a rear end surface of a metal terminal of a spark plug, comprising the steps of:
    holding the spark plug such that a predetermined distance is established along an image capturing direction orthogonal to the rear end surface of the metal terminal between the rear end surface and a camera that captures an image of the rear end surface;
    illuminating the rear end surface with irradiation light by an illuminator having a light source which is disposed between the rear end surface and the camera with respect to the image capturing direction at a position such that reflected light resulting from regular reflection of the irradiation light emitted from the light source and impinging on the rear end surface is not incident on the camera;
    capturing an image of the rear end surface in the image capturing direction by using the camera;
    performing image processing on an image captured by the camera, and acquiring characteristic information of the identification mark from an image of the identification mark in the captured image;
    comparing the characteristic information of the identification mark and characteristic information of a reference mark acquired beforehand from an image of the reference mark; and
    judging whether or not the identification mark and the reference mark are the same mark.

12. The method according to claim 11, wherein in the illuminating step, the irradiation light is shed on the rear end surface in a direction which forms an angle of 45 degrees or less with respect to the rear end surface.

13. The method according to claim 12, wherein the illuminator is configured such that a single piece of the light source is disposed continuously around a line coinciding with the image capturing direction or such that a plurality of the light sources are disposed intermittently around the line coinciding with the image capturing direction.

14. The method according to claim 11, wherein the illuminator is configured such that the light source is a single device disposed continuously around a line coinciding with the image capturing direction or a plurality of sources are devices disposed intermittently around the line coinciding with the image capturing direction.

15. The method according to claim 14, wherein:
the rear end surface of the metal terminal has a maximum diameter or diagonal length of 10 mm or less, and
the illuminator is configured such that the light source has an annular shape, whose minimum inside diameter is 10 mm.

16. The method according to claim 15, wherein a distance along the image capturing direction between the rear end surface and the light source of the illuminator is 10 mm or less.

17. The device for inspecting an inspection object according to claim 14, wherein the device is an LED.

18. A method for manufacturing a spark plug, comprising:
a manufacturing step of manufacturing the spark plug by attaching to a metallic shell a ceramic insulator which holds a forward end portion of a metal terminal;
a marking step of forming an identification mark on a rear end surface of the metal terminal; and
an inspection step of inspecting the identification mark, wherein
the inspection step comprises the steps of:
holding the spark plug such that a predetermined distance is established along an image capturing direction orthogonal to the rear end surface of the metal terminal between the rear end surface and a camera that captures an image of the rear end surface;
illuminating the rear end surface with irradiation light by an illuminator having a light source which is disposed between the rear end surface and the camera with respect to the image capturing direction at a position such that reflected light resulting from regular reflection of the irradiation light emitted from the light source and impinging on the rear end surface is not incident on the camera;
capturing an image of the rear end surface in the image capturing direction by using the camera;
performing image processing on an image captured by the camera, and acquiring characteristic information of the identification mark from an image of the identification mark in the captured image;
comparing the characteristic information of the identification mark and characteristic information of a reference mark acquired beforehand from an image of the reference mark; and
judging whether or not the identification mark and the reference mark are the same mark.

* * * * *